(12) United States Patent
Takada

(10) Patent No.: US 8,989,987 B2
(45) Date of Patent: Mar. 24, 2015

(54) ENGINE CONTROL DEVICE

(71) Applicant: Fuji Jukogyo Kabushiki Kaisha, Tokyo (JP)

(72) Inventor: Tomohiro Takada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 102 days.

(21) Appl. No.: 13/914,480

(22) Filed: Jun. 10, 2013

(65) Prior Publication Data
US 2014/0007826 A1 Jan. 9, 2014

(30) Foreign Application Priority Data
Jul. 4, 2012 (JP) .................................. 2012-150596

(51) Int. Cl.
*F02D 13/02* (2006.01)
*G06F 7/00* (2006.01)
*F01L 1/34* (2006.01)

(52) U.S. Cl.
CPC . *F02D 13/02* (2013.01); *G06F 7/00* (2013.01); *F01L 1/34* (2013.01); *Y02T 10/18* (2013.01)
USPC .......................................................... 701/103

(58) Field of Classification Search
CPC ............... F02D 13/02; G06F 7/00; F01L 1/34
USPC ................................................... 701/103, 105
See application file for complete search history.

(56) References Cited

U.S. PATENT DOCUMENTS 6,070,680 A * 6/2000 Oyama .......................... 701/22
8,707,936 B2 * 4/2014 Kitamura et al. .......... 123/90.15

FOREIGN PATENT DOCUMENTS

JP          10-141098 A          5/1998

* cited by examiner

*Primary Examiner* — Hieu T Vo
(74) *Attorney, Agent, or Firm* — McGinn IP Law Group, PLLC

(57) ABSTRACT

When an acceleration flag is not set, an amount of target rotation tvttbb1 of a variable valve mechanism is set on the basis of an amount of intake air and an engine speed. On the other hand, when the acceleration flag is set, an amount of target rotation of the variable valve mechanism is set on the basis of the engine speed, a cooling water temperature, and an atmospheric pressure. As described above, when the acceleration flag is not set, i.e., when the amount of intake air does not change excessively, the amount of target rotation based on the amount of intake air is used, so that the valve timing can be controlled appropriately.

8 Claims, 10 Drawing Sheets

FIG. 8A

| ENGINE SPEED: NE [rpm] | 800 | 1000 | 1200 | 1600 | 2000 | 2400 | ~ | 5200 | 5600 | 6000 | 6400 |
|---|---|---|---|---|---|---|---|---|---|---|---|
| REFERENCE ROTATION AMOUNT: tvttfl [°CA] | 0 | 0 | 10 | 20 | 35 | 25 | ~ | 15 | 0 | -10 | -10 |

FIG. 8B

| ATMOSPHERIC PRESSURE: PA [mmHg] | 450 | 500 | 550 | 600 | 650 | 700 | 750 |
|---|---|---|---|---|---|---|---|
| ATMOSPHERIC PRESSURE COEFFICIENT: tvttflpa | 0 | 0.4 | 0.8 | 1 | 1 | 1 | 1 |

FIG. 8C

| ENGINE SPEED: NE [rpm] | 800 | 1000 | 1200 | 1600 | 2000 | 2400 | ~ | 5200 | 5600 | 6000 | 6400 |
|---|---|---|---|---|---|---|---|---|---|---|---|
| CORRECTION ROTATION AMOUNT: tvttflp [°CA] | 0 | 0 | -5 | -15 | -30 | -20 | ~ | -10 | 0 | 5 | 5 |

FIG. 8D

| COOLING WATER TEMPERATURE: TW [°C] | -20 | -10 | 0 | 10 | 20 | 30 | 80 | 90 | 100 | 110 |
|---|---|---|---|---|---|---|---|---|---|---|
| WATER TEMPERATURE COEFFICIENT: tvttflw | 1 | 1 | 0.8 | 0.6 | 0.4 | 0.2 | 0 | 0 | 0 | 0 |

FIG. 9

AMOUNT OF TARGET ROTATION: tevttbb1 [°CA]

| AMOUNT OF INTAKE AIR: GN [g/rev] | ENGINE SPEED : NE [rpm] | | | | | | |
|---|---|---|---|---|---|---|---|
| | 800 | 1000 | 1200 | 1600 | 6000 | 6400 |
| 0.1 | 0 | 0 | 0 | 0 | 0 | 0 |
| 0.2 | 0 | 10 | 20 | 20 | 0 | 0 |
| 0.3 | 0 | 15 | 20 | 20 | 0 | 0 |
| 0.4 | 0 | 20 | 20 | 20 | 0 | 0 |
| 0.5 | 0 | 20 | 20 | 15 | 0 | 0 |
| 0.6 | 0 | 20 | 30 | 10 | 10 | 10 |
| 0.7 | 0 | 20 | 30 | 10 | 15 | 15 |
| 0.8 | 0 | 20 | 30 | 10 | 15 | 15 |
| 0.9 | 0 | 20 | 30 | 10 | 15 | 15 |
| 1.0 | 0 | 20 | 30 | 10 | 15 | 15 |

FIG. 10A

| ENGINE SPEED : NE [rpm] | 800 | 1000 | 1200 | 1600 | 2000 | 2400 | 5200 | 5600 | 6000 | 6400 |
|---|---|---|---|---|---|---|---|---|---|---|
| REFERENCE ROTATION AMOUNT: tevttfl [°CA] | 0 | 20 | 30 | 10 | 5 | 5 | 10 | 15 | 15 | 15 |

FIG. 10B

| ATMOSPHERIC PRESSURE: PA [mmHg] | 450 | 500 | 550 | 600 | 650 | 700 | 750 |
|---|---|---|---|---|---|---|---|
| ATMOSPHERIC PRESSURE COEFFICIENT: tevttflpa | 0 | 0.4 | 0.8 | 1 | 1 | 1 | 1 |

FIG. 10C

| ENGINE SPEED : NE [rpm] | 800 | 1000 | 1200 | 1600 | 2000 | 2400 | 5200 | 5600 | 6000 | 6400 |
|---|---|---|---|---|---|---|---|---|---|---|
| CORRECTION ROTATION AMOUNT: tevttflp [°CA] | 0 | −20 | −30 | 10 | −5 | −5 | −10 | −15 | −15 | −15 |

FIG. 10D

| COOLING WATER TEMPERATURE: TW [°C] | −20 | −10 | 0 | 10 | 20 | 30 | 80 | 90 | 100 | 110 |
|---|---|---|---|---|---|---|---|---|---|---|
| WATER TEMPERATURE COEFFICIENT: tevttflw | 1 | 1 | 0.8 | 0.6 | 0.4 | 0.2 | 0 | 0 | 0 | 0 |

ENGINE CONTROL DEVICE

CROSS-REFERENCE TO RELATED APPLICATIONS

The present application claims priority from Japanese Patent Application No. 2012-150596 filed on Jul. 4, 2012, the entire contents of which are hereby incorporated by reference.

BACKGROUND OF THE INVENTION

1. Field of the Invention

The present invention relates to an engine control device having a variable valve mechanism.

2. Description of the Related Art

There has been developed an engine having a variable valve mechanism in a valve system for changing performance characteristics based on the operation state of the engine. The variable valve mechanism is provided between a camshaft and a driven sprocket, and the rotation phase of the camshaft with respect to the driven sprocket can be changed using this variable valve mechanism. More specifically, valve timing can be changed using the variable valve mechanism, and this can control the amount of overlap in which both of an intake valve and an exhaust valve are open. For example, in a low-load operation region of an engine, the valve timing is controlled to reduce the amount of overlap. On the other hand, in a high-load operation region of the engine, the valve timing is controlled to increase the amount of overlap. Accordingly, in various kinds of operation states of the engine, the volume efficiency of the intake air can be improved, and the engine torque can be improved (see Japanese Unexamined Patent Application Publication (JP-A) No. 10-141098).

BRIEF SUMMARY OF THE INVENTION

When mapping data are set on the basis of the engine speed and the amount of intake air and accordingly the valve timing is controlled using the mapping data as explained in JP-A No. 10-141098, reduction may be caused in responsiveness of the valve timing control. More specifically, during, for example, sudden acceleration in which the amount of intake air is greatly changed, the valve timing changes only after the increase of the amount of intake air. This causes delay in the valve timing control. Such delay in the valve timing control makes it difficult to achieve appropriate valve timing control based on the operation state of the engine, and may cause reduction in the engine torque.

BRIEF SUMMARY OF THE INVENTION

The present invention has been designed in consideration of the circumstances described above, and an object thereof is to appropriately control the valve timing based on the operation state of the engine.

An aspect of the present invention provides an engine control device including: a variable valve mechanism for adjusting an opening/closing period of at least one of an intake valve and an exhaust valve provided in an engine; a first opening/closing period setting unit for setting a first opening/closing period on the basis of an amount of intake air and an output shaft rotation speed of the engine; a second opening/closing period setting unit for setting a second opening/closing period on the basis of the output shaft rotation speed of the engine; an acceleration determination unit for determining an acceleration state of a vehicle on the basis of at least one of an accelerator pedal position, a degree of opening of throttle, and an intake tube pressure; and an opening/closing period control unit. When the acceleration state is less than a predetermined state, the opening/closing period control unit controls the variable valve mechanism using the first opening/closing period. When the acceleration state is more than the predetermined state, the opening/closing period control unit controls the variable valve mechanism using the second opening/closing period.

Preferably, the second opening/closing period setting unit sets the second opening/closing period without using the amount of intake air.

Preferably, the second opening/closing period setting unit sets the second opening/closing period on the basis of the output shaft rotation speed and the atmospheric pressure.

Preferably, the second opening/closing period setting unit sets the second opening/closing period on the basis of the output shaft rotation speed and the engine temperature.

Preferably, the second opening/closing period setting unit sets the second opening/closing period on the basis of the output shaft rotation speed, the atmospheric pressure, and the engine temperature.

According to the present invention, when the acceleration state is less than the predetermined state, the variable valve mechanism is controlled using the first opening/closing period, and on the other hand, when the acceleration state is more than the predetermined state, the variable valve mechanism is controlled using the second opening/closing period. Accordingly, when the acceleration state is less than the predetermined state, i.e., when the amount of intake air does not change excessively, the first opening/closing period based on the amount of intake air is used to appropriately control the valve timing. On the other hand, when the acceleration state is more than the predetermined state, i.e., when the amount of intake air changes, the second opening/closing period based on the output shaft rotation speed is used to appropriately control the valve timing.

BRIEF DESCRIPTION OF THE SEVERAL VIEWS OF THE DRAWINGS

FIGS. 8A to 8D are explanatory diagrams illustrating examples of table data to be looked up when setting the amount of target rotation;

FIG. 9 is an explanatory diagram illustrating an example of mapping data to be looked up when setting the amount of target rotation; and FIGS. 10A to 10D are explanatory diagrams illustrating examples of table data to be looked up when setting the amount of target rotation.

DETAILED DESCRIPTION OF THE INVENTION

Figure 1:
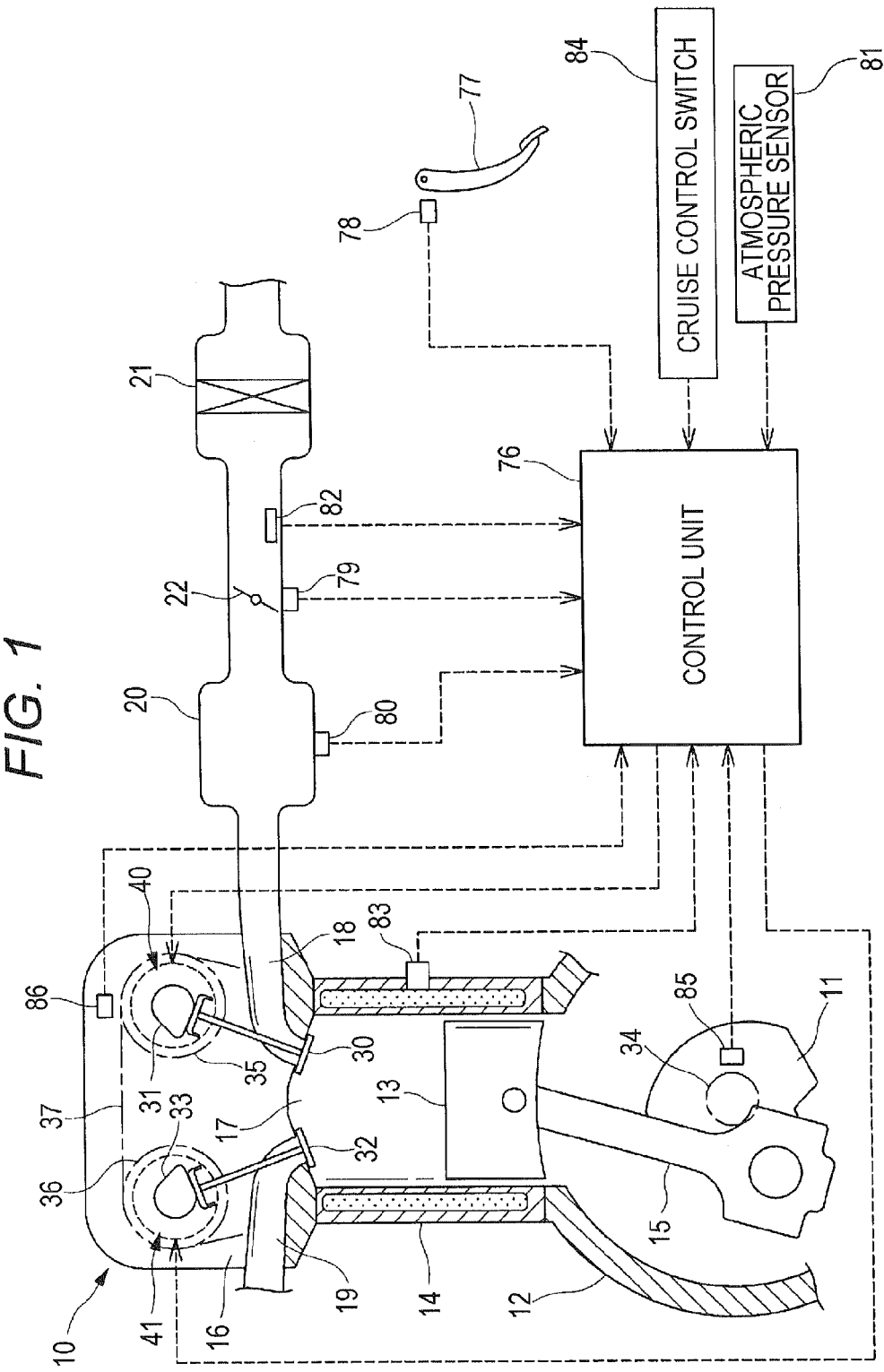
FIG. 1 is a schematic view illustrating an engine and a control system thereof.

An embodiment of the present invention will be explained in detail below with reference to the drawings. FIG. 1 is a schematic view illustrating an engine 10 and a control system thereof. More specifically, FIG. 1 illustrates an engine control device including an engine 10 and a control system thereof. As illustrated in FIG. 1, the engine 10 includes a crankcase 12 accommodating a crank shaft (output shaft) 11 in a rotatable manner and a cylinder 14 accommodating a piston 13 in a reciprocally movable manner. The crank shaft 11 and the piston 13 are coupled with a connecting rod 15, and the reciprocal movement of the piston 13 is converted into rotation movement of the crank shaft 11. An intake port 18 and an exhaust port 19, which are open to a combustion chamber 17, are formed on a cylinder head 16 provided at the upper side of the cylinder 14. An intake tube 20 is connected to the intake port 18 of the cylinder head 16, and an air cleaner 21 for removing dust and the like from intake air is connected to the intake tube 20. Further, a throttle valve 22 is provided in the intake tube 20 such that it can be freely opened and closed, and the amount of intake air can be adjusted with the throttle valve 22.

An intake valve 30 for opening and closing the intake port 18 is provided on the cylinder head 16 in a reciprocally movable manner, and an intake camshaft 31 for opening and closing the intake valve 30 is also provided on the cylinder head 16 in a rotatable manner. Likewise, an exhaust valve 32 for opening and closing the exhaust port 19 is provided on the cylinder head 16 in a reciprocally movable manner, and an exhaust camshaft 33 for opening and closing the exhaust valve 32 is also provided on the cylinder head 16 in a rotatable manner. A timing chain 37 is wound around a drive sprocket 34 provided on the crank shaft 11, a driven sprocket 35 provided on the intake camshaft 31, and a driven sprocket 36 provided on the exhaust camshaft 33. In this configuration, the intake valve 30 and the exhaust valve 32 are driven to be opened and closed in synchronization with the reciprocal movement of the crank shaft 11.

Figure 2:
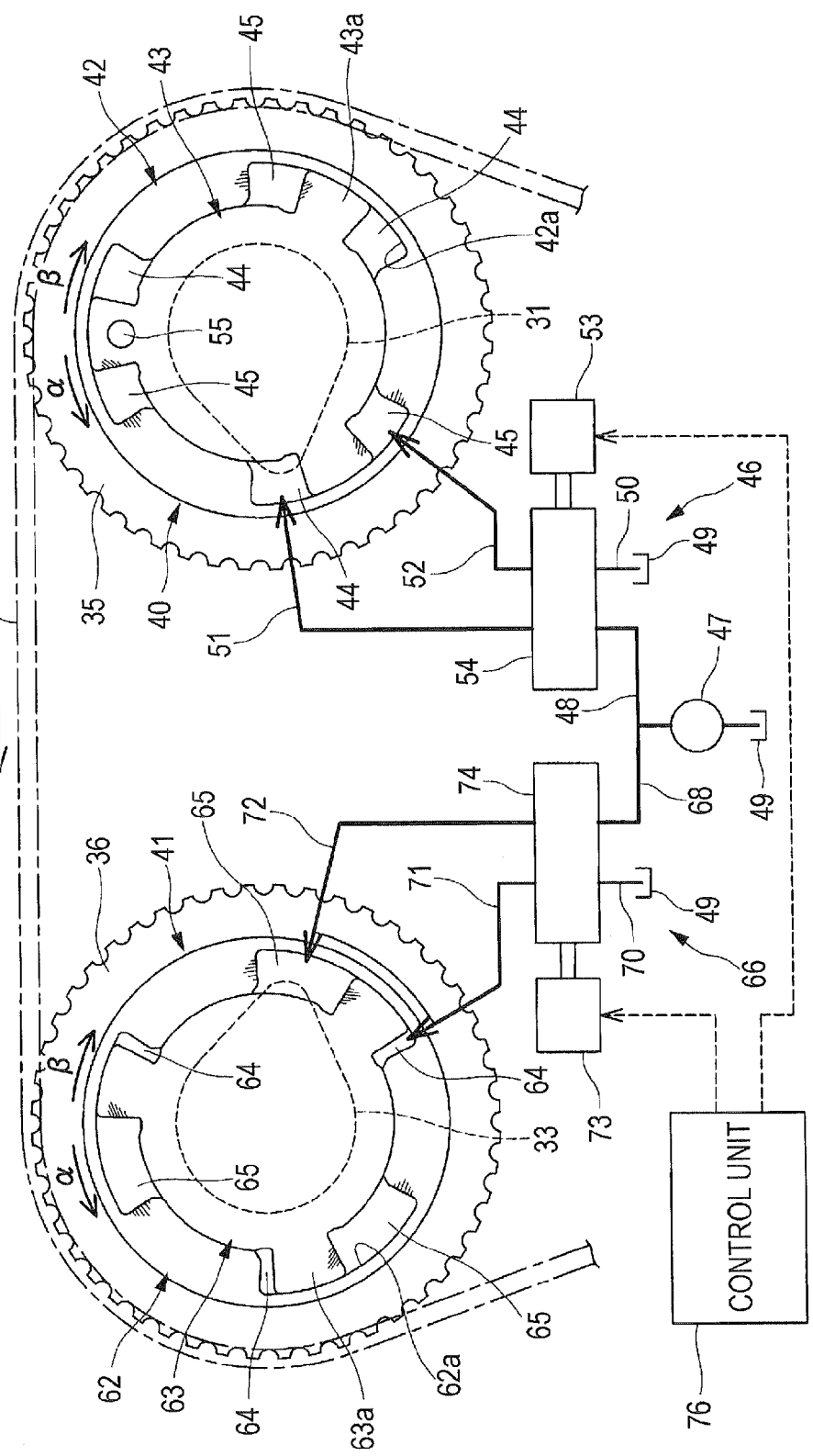
FIG. 2 is a schematic view illustrating variable valve mechanisms provided in the engine and a hydraulic system therefor.
Figure 3B:
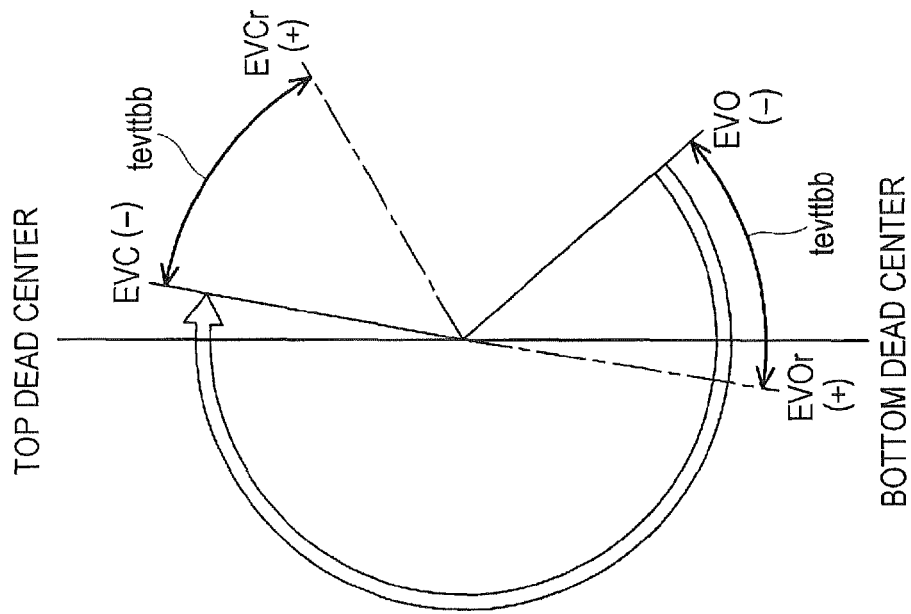
FIG. 3B is an explanatory diagram illustrating a variable state of valve timing with a variable valve mechanism.
Figure 3A:
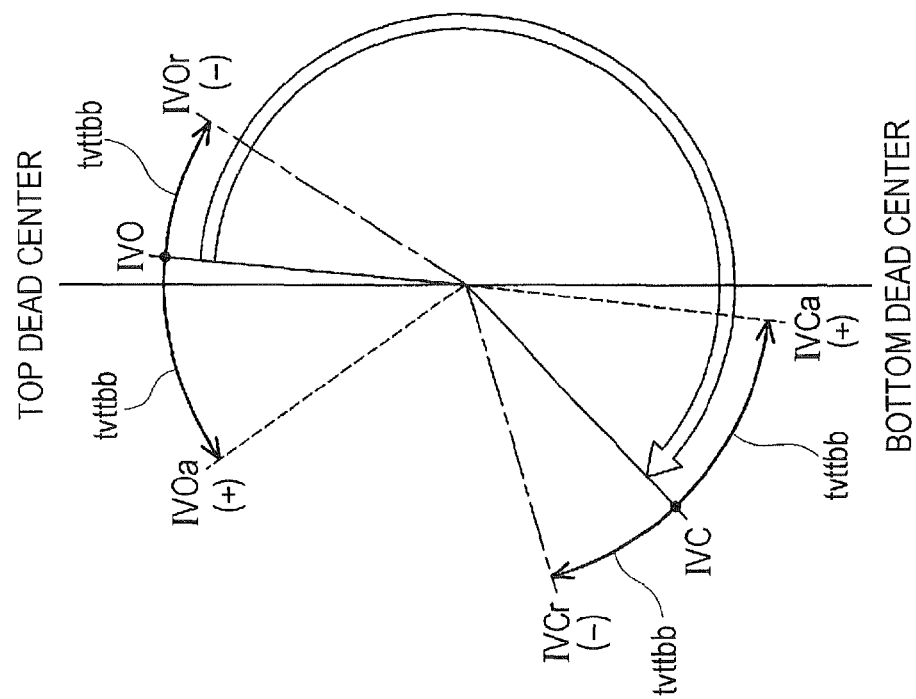
FIG. 3A is an explanatory diagram illustrating a variable state of valve timing with a variable valve mechanism.

FIG. 2 is a schematic view illustrating variable valve mechanisms 40 and 41 provided in the engine 10 and a hydraulic system therefor. Arrow a in FIG. 2 denotes moving direction of the timing chain 37. FIG. 3A is an explanatory diagram illustrating variable state of valve timing with a variable valve mechanism 40, and FIG. 3B is an explanatory diagram illustrating variable state of valve timing with a variable valve mechanism 41. First, as illustrated in FIG. 2, the variable valve mechanism 40 is provided on the driven sprocket 35 of the intake camshaft 31. The variable valve mechanism 40 includes a housing 42 fixed to the driven sprocket 35 and a rotor 43 fixed to the intake camshaft 31. The housing 42 includes multiple recessed portions 42a formed therewith, and the rotor 43 accommodated in the housing 42 has multiple projecting portions 43a formed thereon. The projecting portion 43a of the rotor 43 is accommodated in the recessed portion 42a of the housing 42, and an advance chamber 44 and a retard chamber 45 are provided between the housing 42 and the rotor 43.

Accordingly, when hydraulic oil is provided to the advance chamber 44, and hydraulic oil is discharged from the retard chamber 45, then the rotor 43 can be rotated in the direction of arrow α with respect to the housing 42. More specifically, the intake camshaft 31 can be rotated in an advanced angle direction as indicated by arrow α with respect to the driven sprocket 35. On the other hand, when hydraulic oil is provided to the retard chamber 45, and hydraulic oil is discharged from the advance chamber 44, then the rotor 43 can be rotated in the direction of arrow β with respect to the housing 42. More specifically, the intake camshaft 31 can be rotated in a retarded angle direction as indicated by arrow β with respect to the driven sprocket 35. Accordingly, as indicated by the arrow in FIG. 3A, the valve timing of the intake valve 30 can be controlled freely between the maximum advance timing IVOa (IVCa) and the maximum retard timing IVOr (IVCr).

A hydraulic control circuit 46 is connected to the variable valve mechanism 40 in order to control the supply of the hydraulic oil to the advance chamber 44 and the retard chamber 45 of the variable valve mechanism 40 so as to rotate the intake camshaft 31 in the advanced angle direction and the retarded angle direction, as described above. The hydraulic control circuit 46 includes a oil supply path 48 connected to an oil pump 47, an oil discharge path 50 opened to an oil pan 49, an oil supply/discharge path 51 connected to the advance chamber 44, and an oil supply/discharge path 52 connected to the retard chamber 45. The hydraulic control circuit 46 includes an oil path switch valve 54 operated with an electric actuator 53. The oil supply path 48 is connected to an input port of the oil path switch valve 54, and the oil discharge path 50 is connected to a discharge port of the oil path switch valve 54. The oil supply/discharge path 51 is connected to an output port of the oil path switch valve 54, and the oil supply/discharge path 52 is connected to an output port of the oil path switch valve 54. With the electric actuator 53, a spool valve shaft, not shown, of the oil path switch valve 54 is operated to an advanced angle position, whereby the oil supply/discharge path 51 of the advance chamber 44 is connected to the oil supply path 48, and the oil supply/discharge path 52 of the retard chamber 45 is connected to the oil discharge path 50. Accordingly, the hydraulic oil can be supplied to the advance chamber 44 and discharged from the retard chamber 45, and therefore, the intake camshaft 31 can be rotated in the advanced angle direction (arrow α direction). On the other hand, with the electric actuator 53, a spool valve shaft, not shown, of the oil path switch valve 54 is operated to a retarded angle position, whereby the oil supply/discharge path 52 of the retard chamber 45 is connected to the oil supply path 48, and the oil supply/discharge path 51 of the advance chamber 44 is connected to the oil discharge path 50. Accordingly, the hydraulic oil can be supplied to the retard chamber 45 and discharged from the advance chamber 44, and therefore, the intake camshaft 31 can be rotated in the retarded angle direction (arrow β direction).

A lock pin 55 driven with hydraulic pressure is provided on the rotor 43, and this lock pin 55 can freely move between an engagement position for engagement with the driven sprocket 35 and a retracted position away from the driven sprocket 35. When the oil pump 47 is operated, hydraulic oil is provided to a hydraulic chamber, not shown, whereby the lock pin 55 moves to the retracted position, and the rotor 43 can rotate with respect to the driven sprocket 35. On the other hand, when the oil pump 47 stops, the hydraulic oil is discharged from the hydraulic chamber, not shown, whereby the lock pin 55 moves to the engagement position, and the rotor 43 is fixed to the driven sprocket 35 at a position indicated in FIG. 2. Accordingly, as indicated in FIG. 3A, when the engine stops and the oil pump 47 stops, the valve timing of the intake valve 30 can be controlled in a reference opening timing IVO (reference closing timing IVC) between the maximum advance timing IVOa (IVCa) and the maximum retard timing IVOr (IVCr). In the explanation below, the amount of rotation (the amount of advanced angle, the amount of retarded angle) of the rotor 43 with respect to the housing 42 will be indicated in such a manner that the advanced angle direction is denoted with "+" and the retarded angle direction is denoted with "−" where the reference opening timing IVO (reference closing timing IVC) is adopted as the reference (zero degree). More specifically, a direction in which the amount of overlap of the intake valve 30 and the exhaust valve 32 increases is denoted as "+" side, and a direction in which the amount of overlap decreases is denoted as "−" side.

Like the driven sprocket 35 of the intake camshaft 31, the variable valve mechanism 41 is provided on the driven sprocket 36 of the exhaust camshaft 33. The variable valve mechanism 41 includes a housing 62 fixed to the driven sprocket 36 and a rotor 63 fixed to the exhaust camshaft 33. The housing 62 includes multiple recessed portion 62$a$ formed therewith, and the rotor 63 accommodated in the housing 62 has multiple projecting portion 63$a$ formed thereon. The projecting portion 63$a$ of the rotor 63 is accommodated in the recessed portion 62$a$ of the housing 62, and an advance chamber 64 and a retard chamber 65 are provided between the housing 62 and the rotor 63.

Accordingly, by supplying hydraulic oil to the advance chamber 64 and discharging hydraulic oil from the retard chamber 65, the rotor 63 can be rotated in the direction of arrow α with respect to the housing 62. More specifically, the exhaust camshaft 33 can be rotated in an advanced angle direction as indicated by arrow α with respect to the driven sprocket 36. On the other hand, by supplying hydraulic oil to the retard chamber 65 and discharging hydraulic oil from the advance chamber 64, the rotor 63 can be rotated in the direction of arrow β with respect to the housing 62. More specifically, the exhaust camshaft 33 can be rotated in a retarded angle direction as indicated by arrow β with respect to the driven sprocket 36. Accordingly, as indicated by the arrow in FIG. 3B, the valve timing of the exhaust valve 32 can be controlled freely between the reference opening timing EVO (reference closing timing EVC) and the maximum retard timing EVOr (EVCr). In the explanation below, the amount of rotation (the amount of retarded angle) of the rotor 63 with respect to the housing 62 will be indicated in such a manner that the retarded angle direction is denoted with "+" where reference opening timing EVO (reference closing timing EVC) is adopted as the reference (zero degree). More specifically, a direction in which the amount of overlap of the intake valve 30 and the exhaust valve 32 increases is denoted as "+" side.

As described above, a hydraulic control circuit 66 is connected to the variable valve mechanism 41 in order to control the supply of the hydraulic oil to the advance chamber 64 and the retard chamber 65 of the variable valve mechanism 41 so as to rotate the exhaust camshaft 33 in the advanced angle direction and the retarded angle direction. The hydraulic control circuit 66 includes a oil supply path 68 connected to an oil pump 47, an oil discharge path 70 opened to an oil pan 49, a oil supply/discharge path 71 connected to the advance chamber 64, and a oil supply/discharge path 72 connected to the retard chamber 65. The hydraulic control circuit 66 includes an oil path switch valve 74 operated with an electric actuator 73. The oil supply path 68 is connected to an input port of the oil path switch valve 74, and the oil discharge path 70 is connected to a discharge port of the oil path switch valve 74. The oil supply/discharge path 71 is connected to an output port of the oil path switch valve 74, and the oil supply/discharge path 72 is connected to an output port of the oil path switch valve 74. With the electric actuator 73, a spool valve shaft, not shown, of the oil path switch valve 74 is operated to an advanced angle position, whereby the oil supply/discharge path 71 of the advance chamber 64 is connected to the oil supply path 68, and the oil supply/discharge path 72 of the retard chamber 65 is connected to the oil discharge path 70. Accordingly, the hydraulic oil can be supplied to the advance chamber 64 and discharged from the retard chamber 65, and therefore, the exhaust camshaft 33 can be rotated in the advanced angle direction (arrow α direction). On the other hand, with the electric actuator 73, a spool valve shaft, not shown, of the oil path switch valve 74 is operated to a retarded angle position, whereby the oil supply/discharge path 72 of the retard chamber 65 is connected to the oil supply path 68, and the oil supply/discharge path 71 of the advance chamber 64 is connected to the oil discharge path 70. Accordingly, the hydraulic oil can be supplied to the retard chamber 65 and discharged from the advance chamber 64, and therefore, the exhaust camshaft 33 can be rotated in the retarded angle direction (arrow β direction).

Figure 4:
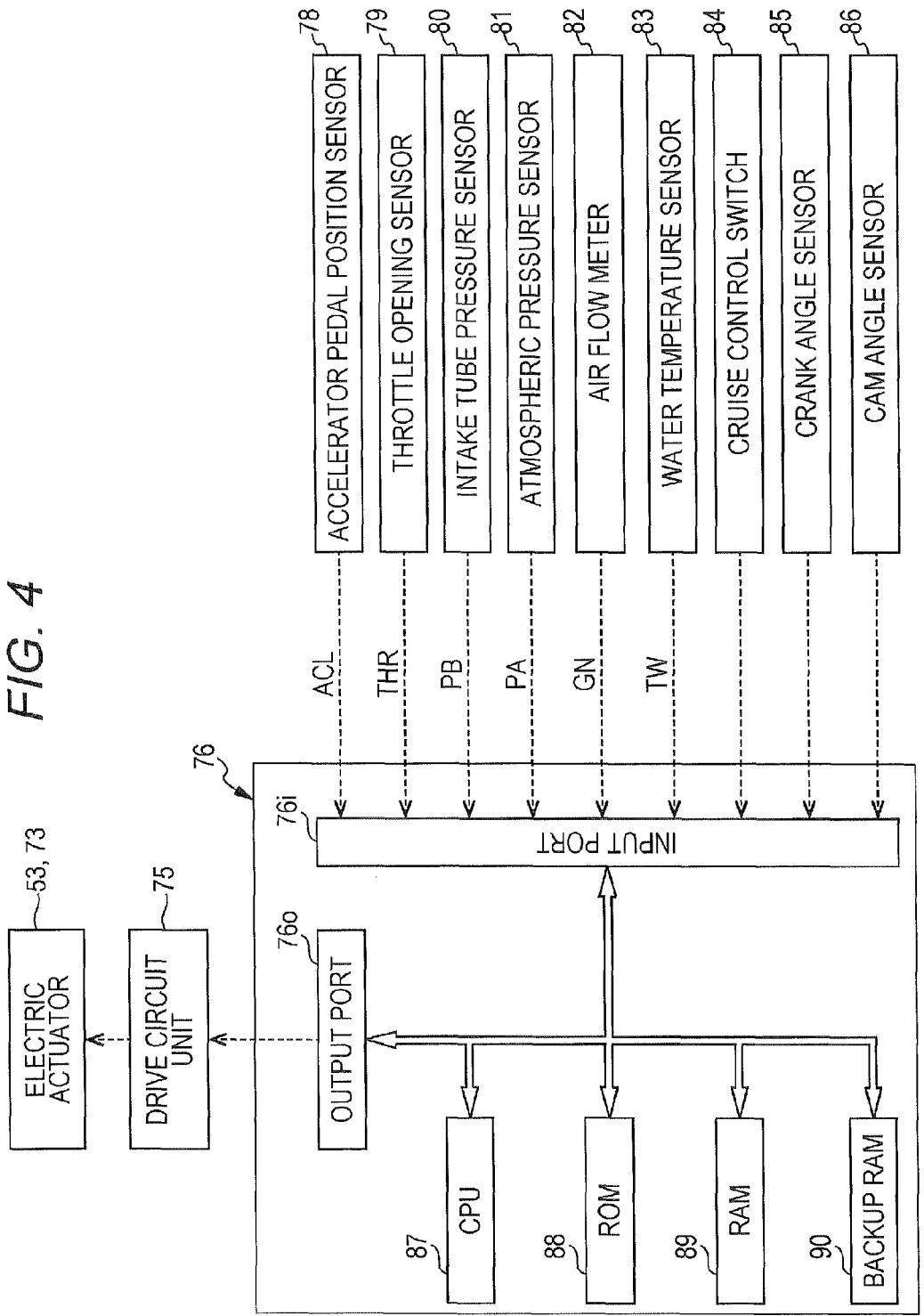
FIG. 4 is a block diagram illustrating a control system of the variable valve mechanism.

FIG. 4 is a block diagram illustrating a control system of the variable valve mechanisms 40 and 41. As illustrated in FIG. 4, a drive circuit unit 75 is connected to the electric actuators 53, 73 to control the electric actuators 53 and 73, and an output port 76$o$ of the control unit 76 is connected to the drive circuit unit 75. The control unit 76 determines the valve timing of the intake valve 30 and the exhaust valve 32 on the basis of signals from kinds of sensors 78 to 86. Then, the control unit 76 outputs a control signal to the drive circuit unit 75 and drives and controls the electric actuators 53, 73 so as to obtain the determined valve timing. Examples of sensors connected to the input port 76$i$ of the control unit 76 include an accelerator pedal position sensor 78 for detecting the amount of depression of an accelerator pedal 77 (hereinafter referred to as accelerator pedal position ACL), a throttle opening sensor 79 for detecting the degree of opening of a throttle valve 22 (hereinafter referred to as the throttle opening THR), an intake tube pressure sensor 80 for detecting the pressure in the intake tube 20 (hereinafter referred to as intake tube pressure PB), an atmospheric pressure sensor 81 for detecting an atmospheric pressure PA, an air flow meter 82 for measuring the amount of intake air GN passing the intake tube 20, a water temperature sensor 83 for detecting a cooling water temperature TW of the engine 10, a cruise control switch 84 operated during activation of a so-called cruise control system for automatically controlling the vehicle speed so that a setting vehicle speed is maintained, a crank angle sensor 85 for detecting a rotation angle of the crank shaft 11, and a cam angle sensor 86 for detecting the rotation angle of the driven sprocket 35. The control unit 76 includes a CPU 87 for calculating a control signal and the like, a ROM 88 for storing a control program, mapping data, and the like, and a RAM 89 and a backup RAM 90 temporarily storing data.

Figure 5:
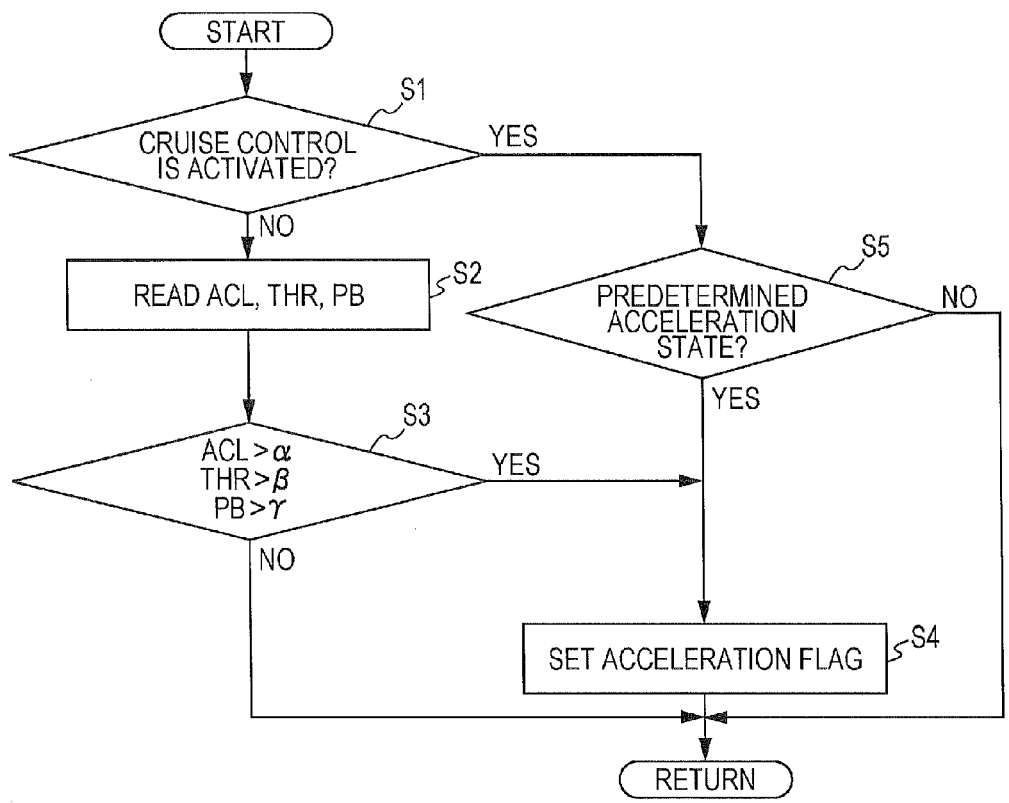
FIG. 5 is a flowchart illustrating control procedure of the variable valve mechanism.
Figure 6:
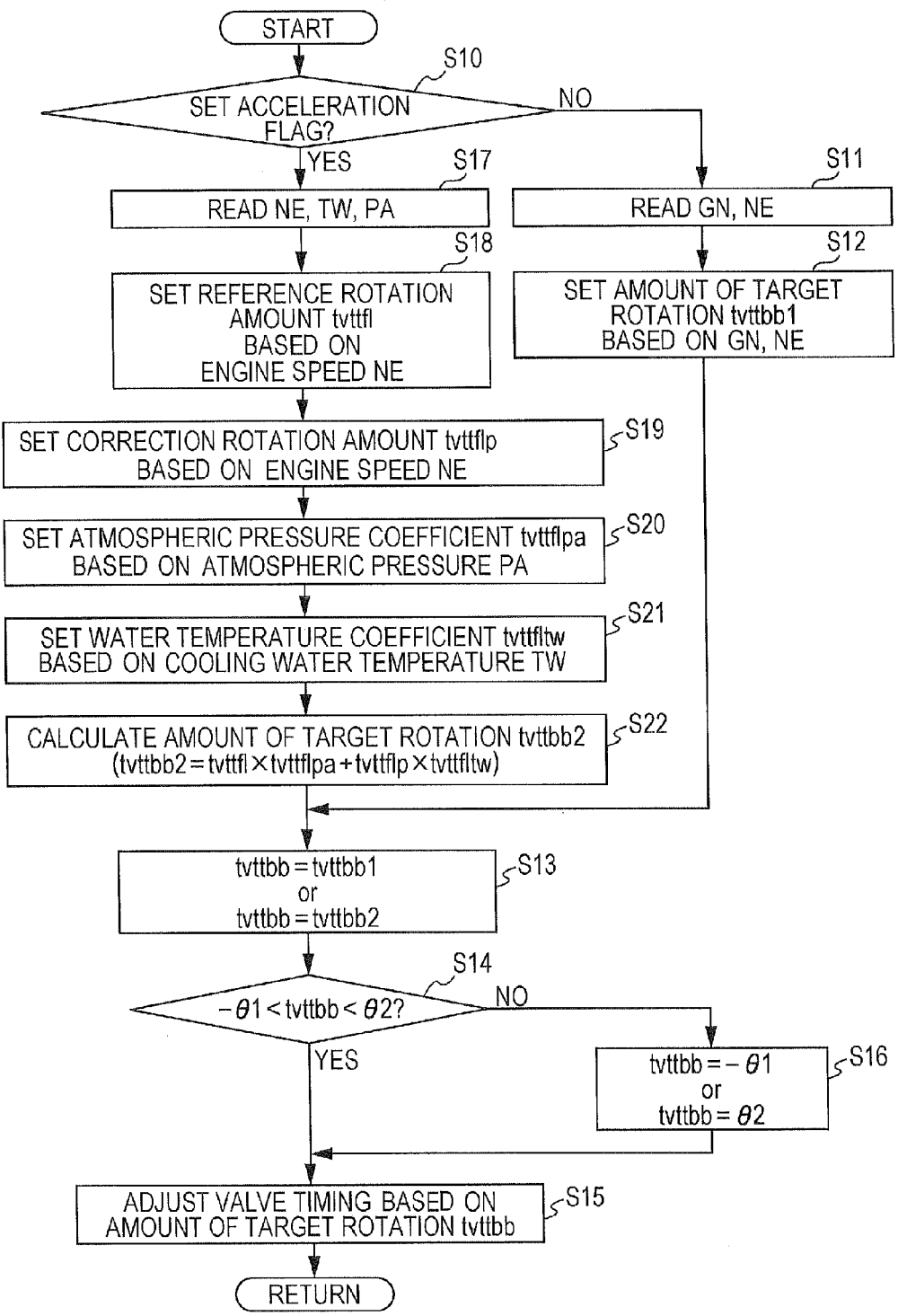
FIG. 6 is a flowchart illustrating control procedure of the variable valve mechanism.
Figure 7:
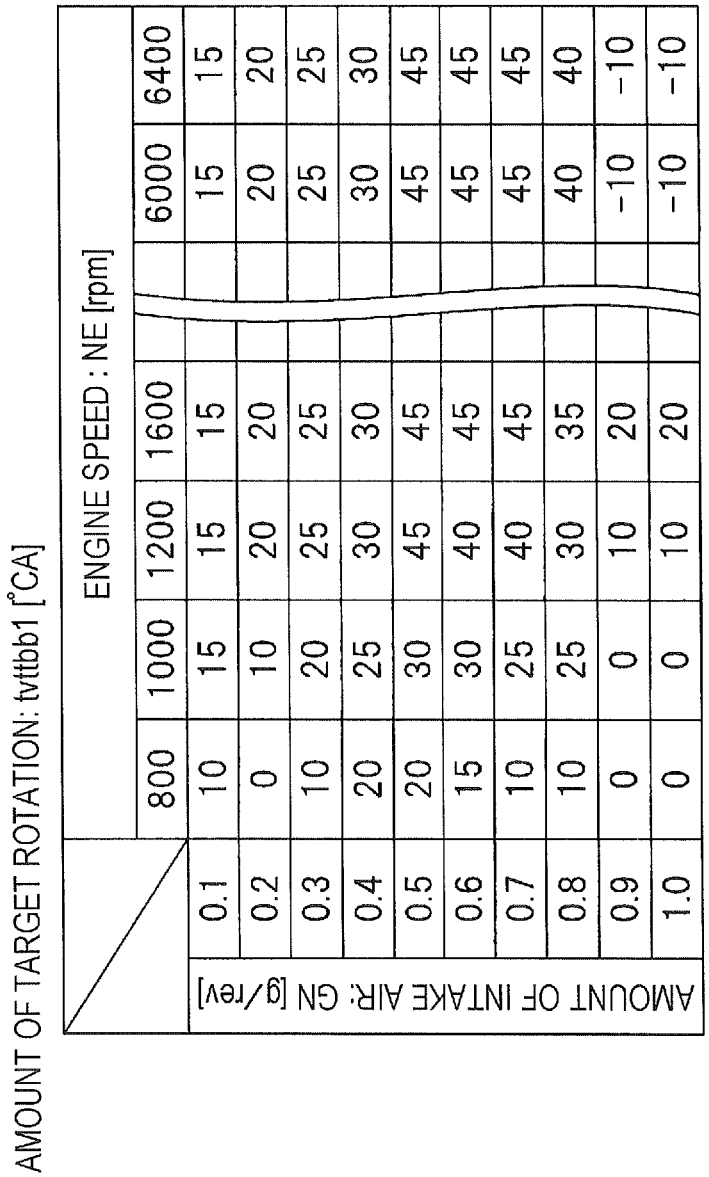
FIG. 7 is an explanatory diagram illustrating an example of mapping data to be looked up when setting the amount of target rotation.

Subsequently, control procedure of the variable valve mechanisms 40 and 41 executed by the control unit 76 will be explained. As explained below, the control unit 76 functions as a first opening/closing period setting unit, a second opening/closing period setting unit, an acceleration determination unit, and an opening/closing period control unit. The variable valve mechanism 40 provided at the intake side and the variable valve mechanism 41 provided at the exhaust side are controlled in accordance with the same control procedure. Therefore, in the explanation below, the control procedure of the variable valve mechanism 40 at the intake side will be explained first, and thereafter, the control procedure of the variable valve mechanism 41 at the exhaust side will be explained briefly. FIGS. 5 and 6 are flowcharts illustrating a control procedure of the variable valve mechanism 40. FIG. 7 is an explanatory diagram illustrating an example of mapping data to be looked up when setting the amount of target rotation (first opening/closing period) tvttbb1. Further, FIGS. 8A to 8D are explanatory diagrams illustrating examples of table data to be looked up when setting the amount of target rotation (second opening/closing period) tvttbb2.

As illustrated in FIG. 5, in step S1, a determination is made as to whether the cruise control system for automatically controlling the vehicle speed is activated or not. When the cruise control system is determined not to be activated in step S1, step S2 is subsequently performed to read the accelerator pedal position ACL, the throttle opening THR, and the intake tube pressure PB. Subsequently, in step S3, a determination is made as to whether the accelerator pedal position ACL is more than a predetermined value $\alpha$, the throttle opening THR is more than a predetermined value $\beta$, and the intake tube pressure PB is more than a predetermined value $\gamma$. When, in step S3, the accelerator pedal position ACL is determined to be more than a predetermined value $\alpha$, the throttle opening THR is determined to be more than a predetermined value $\beta$, and the intake tube pressure PB is determined to be more than a predetermined value $\gamma$, then step S4 is subsequently performed to set an acceleration flag. This acceleration flag is a flag that is set when the acceleration state of the vehicle is more than a predetermined state. In other words, it is a flag that is set when a driver's acceleration request is more than a predetermined level. On the other hand, when, in step S3, the accelerator pedal position ACL is determined to be equal to or less than the predetermined value $\alpha$, or the throttle opening THR is determined to be equal to or less than the predetermined value $\beta$, or the intake tube pressure PB is determined to be equal to or less than predetermined value $\gamma$, then the acceleration flag is not set, and the routine is no longer executed, and thereafter the vehicle's acceleration state is determined from step S1 again. When the cruise control system is determined to be activated in step S1, step S5 is subsequently performed to determine whether the vehicle's acceleration state is more than a predetermined state. When the vehicle's acceleration state is determined to be more than the predetermined state in step S5, step S4 is subsequently performed to set the acceleration flag. On the other hand, when the vehicle's acceleration state is determined to be less than the predetermined state in step S5, the acceleration flag is not set, and the routine is no longer executed, and thereafter the vehicle's acceleration state is determined from step S1 again. In step S5, for example, when the throttle opening THR is determined to be more than the predetermined value $\beta$, and the intake tube pressure PB is determined to be more than the predetermined value $\gamma$, then the vehicle's acceleration state is determined to be more than the predetermined state.

Subsequently, as illustrated in FIG. 6, in step S10, a determination is made as to whether the acceleration flag is set or not. When the acceleration flag is determined not to be set in step S10, i.e., when the acceleration request is not strongly demanded by the driver or the cruise control system, then step S11 is subsequently performed to read the amount of intake air GN and the engine speed NE. The amount of intake air GN is the mass of air that is drawn every time the crank shaft 11 rotates 360 degrees. The engine speed NE is a rotation speed of the crank shaft 11, i.e., an output shaft rotation speed, and is calculated on the basis of a detection signal from the crank angle sensor 85. In step S12 subsequent thereto, the mapping data of FIG. 7 are looked up on the basis of the amount of intake air GN and the engine speed NE, whereby the amount of target rotation tvttbb1 of the variable valve mechanism 40, i.e., the first opening/closing period of the intake valve 30, is set. Subsequently, in step S13, the amount of target rotation tvttbb1 thus set is updated as the amount of target rotation tvttbb for control, and in step S14 subsequent thereto, a determination is made as to whether the amount of target rotation tvttbb is within a predetermined range ($-\theta 1$ to $\theta 2$) or not. When the amount of target rotation tvttbb is determined to be within the predetermined range in step S14, step S15 is subsequently performed, in which the variable valve mechanism 40 is controlled while the amount of target rotation tvttbb of the mapping data is adopted as a target value. On the other hand, when the amount of target rotation tvttbb is determined to be out of the predetermined range in step S14, step 16 is subsequently performed to rewrite the amount of target rotation tvttbb with the lower limit value $-\theta 1$ or the upper limit value $\theta 2$. When the amount of target rotation tvttbb is determined to be less than the lower limit value $-\theta 1$ in step S16, the amount of target rotation tvttbb is rewritten with the lower limit value $-\theta 1$, and when the amount of target rotation tvttbb is determined to be more than the upper limit value $\theta 2$, the amount of target rotation tvttbb is rewritten with the upper limit value $\theta 2$. Then, step S15 is subsequently performed to control the variable valve mechanism 40 while the lower limit value $-\theta 1$ or the upper limit value $\theta 2$ is adopted as the target value. The predetermined range ($-\theta 1$ to $\theta 2$) which serves as a determination reference in step S14 is a movable range of the rotor 43 that is allowed with respect to the housing 42.

On the other hand, when the acceleration flag is determined to be set in step S10, i.e., when the acceleration request is strongly demanded by the driver or the cruise control system, then step S17 is subsequently performed to read the engine speed NE, the cooling water temperature TW, and the atmospheric pressure PA. The cooling water temperature TW means the temperature of the cooling water for cooling the engine 10, i.e., the engine temperature. Subsequently, step S18 is performed to look up the table data of FIG. 8A on the basis of the engine speed NE, whereby a reference rotation amount tvttfl of the variable valve mechanism 40 is set. In step S19 subsequent thereto, the table data of FIG. 8C are looked up on the basis the engine speed NE, whereby a correction rotation amount tvttflp of the variable valve mechanism 40 is set. In step S20 subsequent thereto, the table data of FIG. 8B are looked up on the basis of the atmospheric pressure PA, whereby an atmospheric pressure coefficient tvttflpa is set. In step S21 subsequent thereto, the table data of FIG. 8D are looked up on the basis of the cooling water temperature TW, whereby a water temperature coefficient tvttfltw is set.

Subsequently, step S22 is performed to calculate the amount of target rotation tvttbb2 of the variable valve mechanism 40, i.e., the second opening/closing period of the intake valve 30 on the basis of the expression (1) below. In step S13 subsequent thereto, the amount of target rotation tvttbb2 thus calculated is updated as the amount of target rotation tvttbb for control, and in step S14, a determination is made as to whether the amount of target rotation tvttbb is within a predetermined range ($-\theta 1$ to $\theta 2$). When the amount of target rotation tvttbb is determined to be within the predetermined range in step S14, step S15 is subsequently performed, in which the variable valve mechanism 40 is controlled while the amount of target rotation tvttbb of the mapping data is adopted as a target value. On the other hand, when the amount of target rotation tvttbb is determined to be out of the predetermined range in step S14, step 16 is subsequently performed to rewrite the amount of target rotation tvttbb with the lower limit value $-\theta 1$ or the upper limit value $\theta 2$. Then, step S15 is subsequently performed to control the variable valve mechanism 40 while the lower limit value $-\theta 1$ or the upper limit value $\theta 2$ is adopted as the target value.

$$tvttbb2 = tvttfl \times tvttflpa + tvttflp \times tvttfltw \qquad (1)$$

As explained above, when the acceleration flag is determined not to be set, i.e., when the acceleration request is not strongly demanded by the driver, then the amount of target rotation tvttbb1 is set on the basis of the amount of intake air GN and the engine speed NE, and the variable valve mechanism 40 is controlled on the basis of the amount of target rotation tvttbb1. More specifically, the driving state of the engine 10 when the acceleration flag is cancelled is a steady state of the engine control, i.e., a driving state in which the amount of intake air GN is stable. For this reason, by setting the amount of target rotation tvttbb1 on the basis of the amount of intake air GN, the valve timing can be controlled appropriately based on the driving state of the engine 10.

On the other hand, when the acceleration flag is determined to be set, i.e., when the acceleration request is strongly demanded by the driver, then the amount of target rotation tvttbb2 is set on the basis of the engine speed NE without using the amount of intake air GN, and the variable valve mechanism 40 is controlled on the basis of the amount of target rotation tvttbb2. More specifically, the driving state of the engine 10 when the acceleration flag is set is a transitional state of the engine control, i.e., a driving state in which the amount of intake air GN is greatly changed. For this reason, by setting the amount of target rotation tvttbb2 without using the amount of intake air GN, the valve timing can be controlled appropriately without being affected by the amount of intake air GN which is changing.

Therefore, even when the amount of intake air GN decreases as the car cruises at a high altitude, the valve timing of the intake valve 30 can be advanced actively, whereby reduction of the engine torque can be alleviated during acceleration. More specifically, when the amount of target rotation tvttbb1 based on the mapping data of FIG. 7 is used, the amount of target rotation tvttbb1 can be increased (the angle can be advanced) only after the amount of intake air GN increases. Therefore, when the car cruises at a high altitude and the amount of intake air GN decreases, it used to be difficult to actively increase the amount of target rotation tvttbb1 to promote the increase of the amount of intake air GN. In contrast, when the amount of target rotation tvttbb2 is set on the basis of the engine speed NE without using the amount of intake air GN, the amount of target rotation tvttbb2 can be actively increased without waiting for the increase of the amount of intake air GN. As described above, the amount of target rotation tvttbb2 can be actively increased so as to promote the increase of the amount of intake air GN, and therefore, the amount of intake air GN can be increased even during acceleration while the car cruises at a high altitude, and this enables the vehicle to be accelerated without any discomfort felt by the driver.

Even during acceleration while cruising on a flat land, the vehicle can be accelerated without any discomfort felt by the driver. For example, in the low-load operation region of the engine 10, the absolute amount of intake air GN is low, and therefore, there is not big difference between the amount of intake air GN at 50% accelerator pedal position and the amount of intake air GN at 100% accelerator pedal position. More specifically, when the amount of target rotation tvttbb1 based on the mapping data of FIG. 7 is used, the amount of intake air GN does not change greatly even when, for example, the accelerator pedal 77 is depressed to increase the accelerator pedal position from 50% to 100%, and therefore, it is difficult to actively increase the amount of target rotation tvttbb1 to promote the increase of the amount of intake air GN. In contrast, when the amount of target rotation tvttbb2 is set on the basis of the engine speed NE without using the amount of target rotation tvttbb2 can be actively increased without waiting for the increase of the amount of intake air GN. As described above, the amount of target rotation tvttbb2 can be actively increased so as to promote the increase of the amount of intake air GN, and therefore, the amount of intake air GN can be increased even during acceleration from so-called half throttle while the car is cruising on a flat land, and this enables the vehicle to be accelerated without any discomfort felt by the driver.

When the amount of target rotation tvttbb2 is set on the basis of the engine speed NE, the atmospheric pressure coefficient tvttflpa is set on the basis of the atmospheric pressure PA, and the amount of target rotation tvttbb2 is corrected on the basis of the atmospheric pressure coefficient tvttflpa. More specifically, the control unit 76 sets the amount of target rotation tvttbb2 on the basis of the engine speed NE and the atmospheric pressure PA. the atmospheric pressure coefficient tvttflpa is set to decrease as the atmospheric pressure PA decreases as illustrated in FIG. 8B. More specifically, when the car cruises at a high altitude where the air density is low, the amount of target rotation tvttbb2 is set so as to reduce the amount of target rotation tvttbb2 (retard the angle), i.e., reduce the amount of overlap of the intake valve 30 and the exhaust valve 32. Accordingly, during cruising at a high altitude where the air density is extremely low, the amount of overlap of the intake valve 30 and the exhaust valve 32 can be reduced, and therefore, this can prevent the engine 10 from misfiring due to excessive overlap. As described above, the engine misfire due to overlap can be prevented, and therefore, even when fault diagnosis of the engine 10 is performed by detecting engine misfire, the fault diagnosis of the engine 10 can be executed appropriately.

When the amount of target rotation tvttbb2 is set on the basis of the engine speed NE, the water temperature coefficient tvttfltw is set on the basis of the cooling water temperature TW, and the amount of target rotation tvttbb2 is corrected on the basis of the water temperature coefficient tvttfltw. More specifically, the control unit 76 sets the amount of target rotation tvttbb2 on the basis of the engine speed NE and the cooling water temperature TW. As illustrated in FIG. 8C, in most of the engine rotation region, the correction rotation amount tvttflp is set as minus, as illustrated in FIG. 8D, the greater the cooling water temperature TW is reduced, the higher the water temperature coefficient tvttfltw is set. More specifically, when the cooling water temperature TW is low, i.e., the viscosity of the hydraulic oil supplied to the variable valve mechanism 40 is high, the amount of target rotation tvttbb2 is set to be closer to "0", i.e., so as not to activate the variable valve mechanism 40. Accordingly, this will reduce discrepancy between the amount of target rotation tvttbb2 thus set and the actual operation state of the variable valve mechanism 40, and therefore the valve timing control can be stabilized.

Subsequently, control procedure of the variable valve mechanism 41 at the exhaust side will be explained. FIG. 9 is an explanatory diagram illustrating an example of mapping data to be looked up when setting the amount of target rotation (first opening/closing period) tevttbb1. FIGS. 10A to 10D are explanatory diagrams illustrating examples of table data to be looked up when setting the amount of target rotation (second opening/closing period) tevttbb2. As described above, the variable valve mechanism 41 at the exhaust side is controlled in accordance with the same control procedure as the variable valve mechanism 40 at the intake side. More specifically, like the variable valve mechanism 40 at the intake side, a determination is made as to whether an acceleration flag is set or not based on the flowchart of FIG. 5. Thereafter, when the acceleration flag is determined not to be set, the mapping data of FIG. 9 are looked up on the basis of the amount of intake air GN and the engine speed NE, whereby the amount of target rotation tevttbb1 of the variable valve mechanism 41 is set, i.e., the first opening/closing period of the exhaust valve 32 is set. Then, on the basis of the amount of target rotation tevttbb1 thus set, the variable valve mechanism 41 is controlled. On the other hand, when the acceleration flag is determined to be set, the flowchart of FIG. 6 is executed while the table data of FIGS. 10A to 10D are looked up, whereby the amount of target rotation tevttbb2 of the variable valve mechanism 41 is set, i.e., the second opening/closing period of the exhaust valve 32 is set. Then, on the basis of the amount of target rotation tevttbb2 thus set, the variable valve mechanism 41 is controlled. When the flowchart of FIG. 6 is executed, the reference rotation amount tvttfl at the intake side is replaced with the reference rotation amount tevttfl at the exhaust side, the correction rotation amount tvttflp at the intake side is replaced with the correction rotation amount tevttflp at the exhaust side, the atmospheric pressure coefficient tvttflpa at the intake side is replaced with the atmospheric pressure coefficient tevttflpa at the exhaust side, and the water temperature coefficient tvttfltw at the intake side is replaced with the water temperature coefficient tevttfltw at the exhaust side.

The present invention is not limited to the above embodiment, and various modifications can be made without departing from the scope of the present invention. In the above explanation, the amount of target rotation tvttbb1 and the amount of target rotation tevttbb1 are set by making selection by looking up the mapping data, but the present invention is not limited thereto. It may also be possible to set the amount of target rotation tvttbb1 and the amount of target rotation tevttbb1 by calculation. In the above explanation, the amount of target rotation tvttbb2 and the amount of target rotation tevttbb2 are set by performing calculation on the basis of the engine speed NE, the atmospheric pressure PA, and the cooling water temperature TW, but the present invention is not limited thereto. The amount of target rotation tvttbb2 and the amount of target rotation tevttbb2 may be set by making selection by looking up the mapping data. Further, the amount of target rotation tvttbb2 and the amount of target rotation tevttbb2 may be set on the basis of only the engine speed NE, and the amount of target rotation tvttbb2 and the amount of target rotation tevttbb2 may be set on the basis of only the engine speed NE and the atmospheric pressure PA, and the amount of target rotation tvttbb2 and the amount of target rotation tevttbb2 may be set on the basis of only the engine speed NE and the cooling-water temperature TW. The cooling water temperature TW is used as the engine temperature, but the present invention is not limited thereto. Alternatively, oil temperature and the like may be used as the engine temperature.

In the above explanation, the vehicle's acceleration state is determined on the basis of the accelerator pedal position ACL, the throttle opening THR, and the intake tube pressure PB, but the present invention is not limited thereto. The vehicle's acceleration state may be determined on the basis of at least one of the accelerator pedal position ACL, the throttle opening THR, and the intake tube pressure PB. For example, the acceleration state may be determined on the basis of only the accelerator pedal position ACL, the acceleration state may be determined on the basis of only the throttle opening THR, and the acceleration state may be determined on the basis of only the intake tube pressure PB. The acceleration state may be determined on the basis of the accelerator pedal position ACL and the throttle opening THR, the acceleration state may be determined on the basis of the accelerator pedal position ACL and the intake tube pressure PB, and the acceleration state may be determined on the basis of the throttle opening THR and the intake tube pressure PB.

In the above explanation, the variable valve mechanism 40 is provided at the intake valve 30 side, and the variable valve mechanism 41 is provided at the exhaust valve 32 side, but the present invention is not limited thereto. The variable valve mechanism 40 may be provided only at the intake valve 30 side, or the variable valve mechanism 41 may be provided only at the exhaust valve 32 side. The variable valve mechanisms 40 and 41 driven with hydraulic pressure are used as the variable valve mechanism, but the present invention is not limited thereto. Alternatively, a variable valve mechanism driven by electric power may be used. Further, the variable valve mechanisms 40 and 41 illustrated herein are the variable valve mechanisms of a type for changing the phase of the valve head curve, but the present invention is not limited thereto. The variable valve mechanisms 40 and 41 may be variable valve mechanisms of a type for changing the valve head curve by changing the amount of lift of the valve or the operation angle.

In the case illustrated here, the sprockets 34 to 36 and the timing chain 37 are used to synchronize the intake valve 30 and the exhaust valve 32 with the crank shaft 11, but the present invention is not limited thereto. For example, a pulley and a timing belt may be used to synchronize the intake valve 30 and the exhaust valve 32 with the crank shaft 11. Alternatively, an array of gears may be used to synchronize the intake valve 30 and the exhaust valve 32 with the crank shaft 11.

What is claimed is:

1. An engine control device comprising:
   a variable valve mechanism for adjusting an opening/closing period of at least one of an intake valve and an exhaust valve provided in an engine;
   a first opening/closing period setting unit for setting a first opening/closing period on the basis of an amount of intake air and an output shaft rotation speed of the engine;
   a second opening/closing period setting unit for setting a second opening/closing period on the basis of the output shaft rotation speed of the engine;
   an acceleration determination unit for determining an acceleration state of a vehicle on the basis of at least one of an accelerator pedal position, a degree of opening of throttle, and an intake tube pressure; and
   an opening/closing period control unit,
   wherein when the acceleration state is less than a predetermined state, the opening/closing period control unit controls the variable valve mechanism using the first opening/closing period; and
   wherein when the acceleration state is more than the predetermined state, the opening/closing period control unit controls the variable valve mechanism using the second opening/closing period.

2. The engine control device according to claim 1, wherein the second opening/closing period setting unit sets the second opening/closing period without using the amount of intake air.

3. The engine control device according to claim 2, wherein the second opening/closing period setting unit sets the second opening/closing period on the basis of the output shaft rotation speed and the atmospheric pressure.

4. The engine control device according to claim 2, wherein the second opening/closing period setting unit sets the second opening/closing period on the basis of the output shaft rotation speed and the engine temperature.

5. The engine control device according to claim 2, wherein the second opening/closing period setting unit sets the second opening/closing period on the basis of the output shaft rotation speed, the atmospheric pressure, and the engine temperature.

6. The engine control device according to claim 1, wherein the second opening/closing period setting unit sets the second opening/closing period on the basis of the output shaft rotation speed and the atmospheric pressure.

7. The engine control device according to claim 1, wherein the second opening/closing period setting unit sets the second opening/closing period on the basis of the output shaft rotation speed and the engine temperature.

8. The engine control device according to claim 1, wherein the second opening/closing period setting unit sets the second opening/closing period on the basis of the output shaft rotation speed, the atmospheric pressure, and the engine temperature.

\* \* \* \* \*